(12) United States Patent
Kang et al.

(10) Patent No.: US 9,107,120 B2
(45) Date of Patent: Aug. 11, 2015

(54) APPARATUS AND METHOD FOR HANDOVER IN A COMMUNICATION SYSTEM

(75) Inventors: Hyon-Goo Kang, Suwon-si (KR); Min-Hee Cho, Suwon-si (KR); Jung-Je Son, Seongnam-si (KR); Nam-Gi Kim, Suwon-si (KR); Jae-Hyuk Jang, Daegu (KR)

(73) Assignee: Samsung Electronics Co., Ltd. (KR)

(*) Notice: Subject to any disclaimer, the term of this patent is extended or adjusted under 35 U.S.C. 154(b) by 1801 days.

(21) Appl. No.: 11/960,199

(22) Filed: Dec. 19, 2007

(65) Prior Publication Data

US 2008/0146235 A1    Jun. 19, 2008

(30) Foreign Application Priority Data

Dec. 19, 2006  (KR) .................. 10-2006-0130101

(51) Int. Cl.
*H04W 36/00* (2009.01)
*H04W 84/12* (2009.01)

(52) U.S. Cl.
CPC .......... *H04W 36/0077* (2013.01); *H04W 84/12* (2013.01)

(58) Field of Classification Search
None
See application file for complete search history.

(56) References Cited

U.S. PATENT DOCUMENTS

| 2004/0185853 | A1 | 9/2004 | Kim et al. |
| 2005/0197124 | A1 | 9/2005 | Kang et al. |
| 2005/0282548 | A1 | 12/2005 | Kim et al. |
| 2008/0008131 | A1 * | 1/2008 | Watfa et al. ............. 370/331 |

FOREIGN PATENT DOCUMENTS

| EP | 1 229 751 | 8/2002 |
| KR | 1020050089710 | 9/2005 |
| KR | 1020080054116 | 5/2006 |
| WO | WO 2005/074315 A1 * | 8/2005 ............ H04Q 7/38 |

* cited by examiner

*Primary Examiner* — German J Viana Di Prisco
(74) *Attorney, Agent, or Firm* — The Farrell Law Firm, P.C.

(57) ABSTRACT

A handover method and apparatus for reducing a time delay during handover in a communication system is provided. A Mobile Station (MS) transmits a serving Base Station (BS) a first message indicating that the MS will perform handover to a target BS and the first message includes information for requesting a second message indicating a response to the successful receipt of the first message.

8 Claims, 3 Drawing Sheets

APPARATUS AND METHOD FOR HANDOVER IN A COMMUNICATION SYSTEM

PRIORITY

This application claims priority under 35 U.S.C. § 119(a) to a Korean Patent Application filed in the Korean Intellectual Property Office on Dec. 19, 2006 and assigned Serial No. 2006-130101, the disclosure of which is incorporated herein by reference.

BACKGROUND OF THE INVENTION

1. Field of the Invention

The present invention relates generally to a communication system, and in particular, the present invention relates to an apparatus and method for handover in a communication system.

2. Description of the Related Art

The next generation communication system has evolved to enable the system to perform high-speed data transmission/reception while ensuring the mobility of a plurality of Mobile Stations (MSs). The next generation communication system can provide services having various Quality of Service (QoS) classes. An Institute of Electrical and Electronics Engineers (IEEE) 802.16e communication system is an example of the next generation communication system.

In the IEEE 802.16e communication systems, handover is a very important factor to ensure the mobility of the MSs. The term 'handover' as used herein refers to an action of allowing an MS in service to receive a seamless service while moving between Base Stations (BSs). The 'handover' refers to an action in which an MS moves to a target BS from which it can receive a higher-quality service than its serving BS from which it is presently receiving a service, in response to a decrease in the quality of the service being provided from the serving BS, thereby receiving the seamless service.

FIG. 1 illustrates a handover procedure in an IEEE 802.16e communication system.

Referring to FIG. 1, a serving BS 102 transmits a Mobile Neighbor Advertisement (MOB_NBR-ADV) message to an MS 100 in step 101. Upon receipt of the MOB_NBR-ADV message, the MS 100 can acquire information on neighbor BSs from the received MOB_NBR-ADV message. The MS 100 scans Carrier-to-Interference and Noise Ratios (CINRs), based on which it can measure signal qualities of reference signals, or pilot signals, transmitted from the neighbor BSs in step 103.

After scanning CINRs received from neighbor BS 104 and neighbor BS 106, when the MS 100 determines to switch from its current serving BS 102 to a new BS, it transmits a Mobile Station Handover Request (MOB_MSHO-REQ) message to the serving BS 102 in step 105.

Upon receipt of the MOB_MSHO-REQ message, the serving BS 102 detects a recommended neighbor BS list of the neighbor BSs to which the MS 100 can perform handover, from an Information Element (IE) of the MOB_MSHO-REQ message. The recommended neighbor BS list includes information on the recommended neighbor BSs to which the MS 100 prefers to perform handover. For convenience, it is assumed in FIG. 1 that the recommended neighbor BS list includes the neighbor BS1 104 and the neighbor BS2 106.

The serving BS 102 transmits HO_notification messages to the recommended neighbor BSs, i.e. the neighbor BS1 104 and the neighbor BS2 106, included in the recommended neighbor BS list in steps 107 and 109. The HO_notification message includes information on the bandwidth and QoS that a new serving BS, or an expected target BS, of the MS 100 should provide. Upon receipt of the HO_notification messages, the neighbor BS1 104 and neighbor BS2 106 transmit HO_notification-RSP messages to the serving BS 102 in response to the HO_notification messages in steps 111 and 113. The HO_notification-RSP message includes an action time required until the MS 100 is assigned to a dedicated transmission opportunity for transmitting of a Ranging Request (RNG-REQ) message in performing a network reentry procedure after performing handover to the target BS. Further, the HO_notification-RSP message includes QoS information supportable in the neighbor BS 104 and the neighbor BS 106 among the QoSs used by the MS 100.

The serving BS 102 receives the HO_notification-RSP messages from the neighbor BS1 104 and the neighbor BS2 106 in steps 111 and 113. The serving BS 102 includes information of the neighbor BSs, for example, the action time and QoS information, acquired from the HO_notification-RSP messages, in a Mobile BS HandOver Response (MOB_BSHO-RSP) message, and transmits it to the MS 100 in step 115.

Upon receipt of the MOB_BSHO-RSP message, the MS 100 determines a final target BS that can provide the bandwidth and QoS requested by the MS 100. It will be assumed herein that the MS 100 has determined the neighbor BS1 104 as a final target BS. After determining the final target BS, the MS 100 transmits a Mobile Handover Indication (MOB_HO-IND) message to the serving BS 102 in response to the MOB_BSHO-RSP message in step 117. Upon receipt of the MOB_HO-IND message, the serving BS 102 transmits a HO_confirm message to the target BS 104 included in the MOB_HO-IND message in step 119.

Although not illustrated in the drawing, after transmitting the MOB_HO-IND message to the serving BS 102 in step 117, the MS 100 stops the communication with the serving BS 102 and acquires synchronization with the target BS 104. After acquiring the synchronization with the target BS 104, the MS 100 receives a downlink MAP (DL-MAP) and an uplink MAP (UL-MAP) from the target BS 104 and then attempts handover ranging.

After the MS 100 transmits the MOB_HO-IND message to the serving BS 102, when the serving BS 102 needs a time in analyzing and processing the MOB_HO-IND message, the serving BS 102 can transmit downlink data to the MS 100 while analyzing and processing the corresponding MOB_HO-IND message. In this case, because the MS 100 may interrupt the communication path to the serving BS 102 immediately after transmitting the MOB_HO-IND message to the serving BS 102, the downlink data transmitted from the serving BS 102 to the MS 100 may be lost.

Given that the serving BS 102 needs a time in processing the MOB_HO-IND message after the MS 100 transmits the MOB_HO-IND message to the serving BS 102, the MS 100 may delay the communication path interruption to the serving BS 102, causing a handover delay.

As described above, in the handover procedure of the current IEEE 802.16e communication system, the time at which the MS interrupts the communication path to the serving BS and attempts an access to the target BS after transmitting the MOB_HO-IND message to the serving BS has not been clearly defined.

SUMMARY OF THE INVENTION

An aspect of the present invention is to solve at least the above problems and/or disadvantages and to provide at least the advantages described below. Accordingly, an aspect of the present invention is to provide a handover apparatus and a method for reducing a time delay during handover in a communication system.

Another aspect of the present invention is to provide an apparatus and method for a data-loss free handover in a communication system.

According to one aspect of the present invention, a handover method of a Mobile Station (MS) in a communication system is provided. The handover method includes transmitting a serving Base Station (BS) a first message indicating that the MS will perform handover to a target BS, in which the first message includes information for requesting a second message indicating a response to the successful receipt of the first message when the serving BS receives the first message.

According to another aspect of the present invention, a handover method of a serving Base Station (BS) in a communication system is provided. The handover method includes receiving from a Mobile Station (MS) a first message indicating that the MS will perform handover to a target BS upon receipt of the first message, transmitting the MS a second message indicating the receipt of the first message.

According to further another aspect of the present invention, a handover apparatus in a communication system is provided. The handover apparatus includes a Mobile Station (MS) for transmitting a serving Base Station (BS) a first message indicating that the MS will perform handover to a target BS, in which the first message includes information for requesting a second message indicating a response to the successful receipt of the first message when the serving BS receives the first message.

According to yet another aspect of the present invention, a handover apparatus in a communication system is provided. The handover apparatus includes a serving Base Station (BS) for receiving from a Mobile Station (MS) a first message indicating that the MS will perform handover to a target BS, and upon receipt of the first message, transmitting the MS a second message indicating the receipt of the first message.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides an apparatus and method for a data-loss free handover for reducing a time delay during handover in a communication system. Although an embodiment of the present invention will be described herein with reference to an Institute of Electrical and Electronics Engineers (IEEE) 802.16e communication system, by way of example, the same can be applied to other communication systems.

Figure 1:
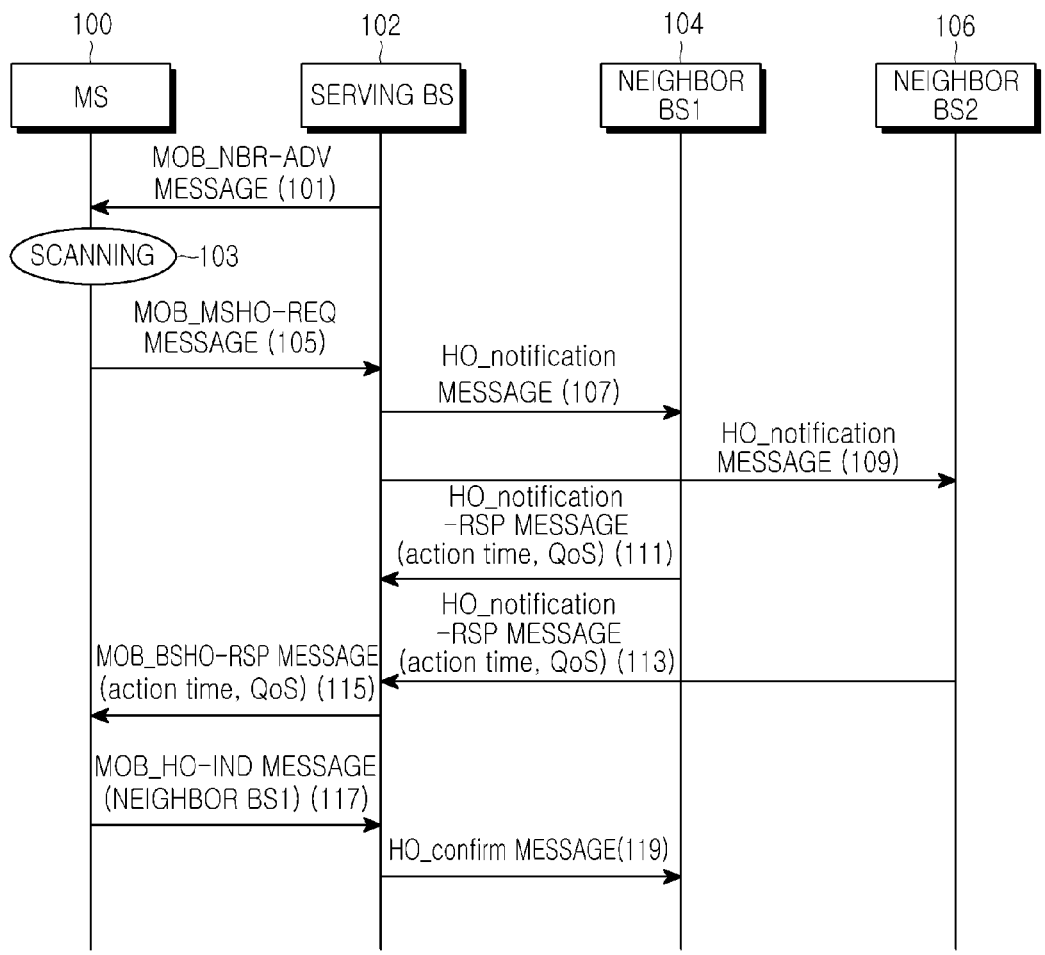
FIG. 1 illustrates a handover procedure in an IEEE 802.16e communication system.
Figure 2:
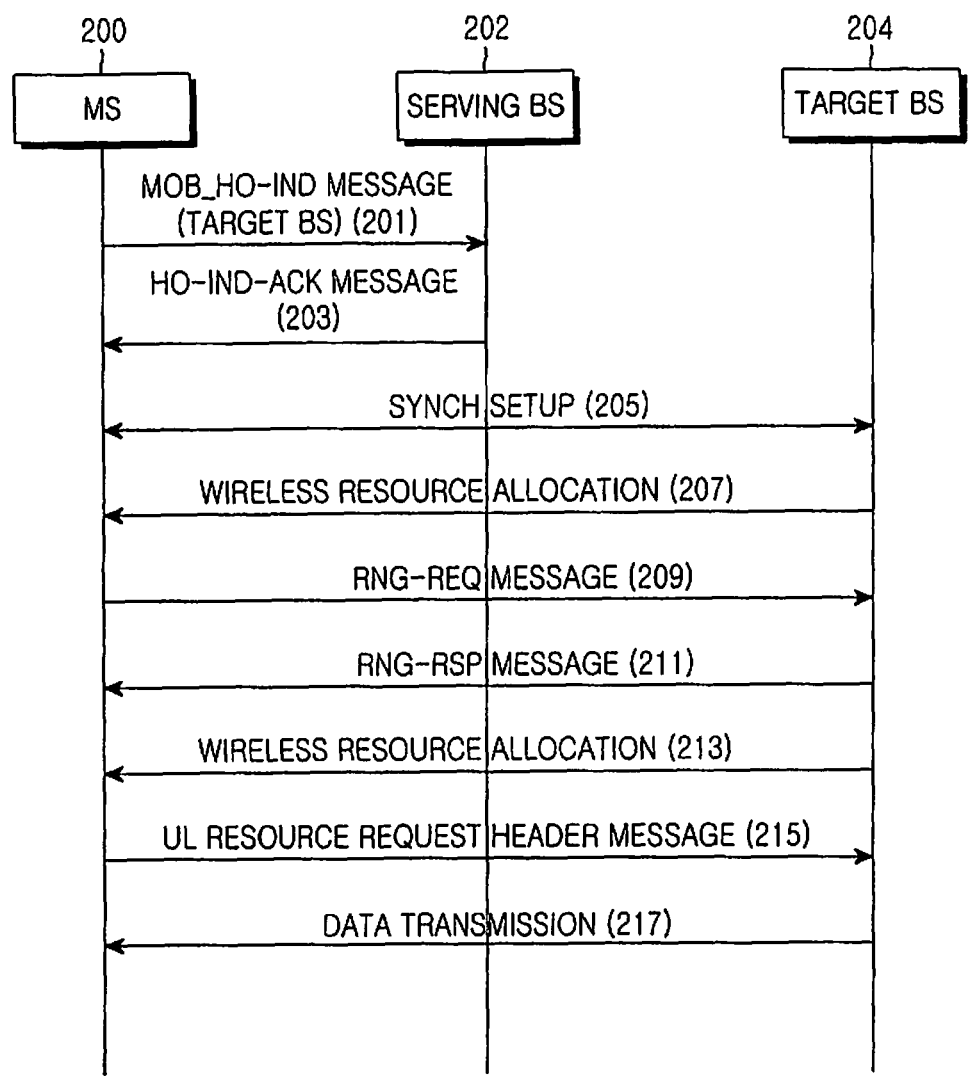
FIG. 2 illustrates a handover procedure according to the present invention.

FIG. 2 illustrates a handover procedure according to the present invention.

Referring to FIG. 2, it will be assumed that a Mobile Station (MS) 200 has determined a final target Base Station (BS) 204 that can provide the bandwidth and Quality of Service (QoS) requested by the MS 200, among neighbor Base Stations (BSs).

Thereupon, the MS 200 transmits a Mobile HandOver Indication (MOB_HO-IND) message to a serving BS 202 in step 201. The MOB_HO-IND message includes a HandOver Indication Acknowledge (HO_IND-ACK) request field for requesting the serving BS 202 to transmit a response message to the MOB_HO-IND message. A format of the MOB_HO-IND message will be described in detail herein below.

Upon receipt of the MOB_HO-IND message, the serving BS 202 provides the target BS 204 with information indicating the time at which the MS 200 will access the target BS 204. After transmitting the MOB_HO-IND message, the MS 200 waits for a HO_IND-ACK message from the serving BS 202.

When the serving BS 202 completes an action for the handover indication of the MS 200 according to the MOB_HO-IND message, the serving BS 202 transmits a HO_IND-ACK message to the MS 200 in step 203. The HO_IND-ACK message includes the time at which the MS 200 will perform ranging to the target BS 204.

Upon receipt of the HO_IND-ACK message, the MS 200 interrupts the communication with the serving BS 202 and sets up synchronization with the target BS 204 in step 205. When the synchronization between the MS 200 and the target BS 204 is set up, the target BS 204 transmits a Fast Ranging Information Element (IE) to the MS 200 to allocate wireless resources for a Ranging Request (RNG-REQ) message that the MS 200 will transmit to the target BS 204 in step 207. The MS 200, receiving the wireless resources allocated from the target BS 204, transmits an RNG-REQ message to the target BS 204 in step 209. Upon receipt of the RNG-REQ message, the target BS 204 performs ranging with the MS 200, and the ranging process is performed to adjust the correct time offset and transmission power between the MS 200 and the target BS 204.

After the ranging process between the target BS 204 and the MS 200 is performed, the target BS 204 transmits a Ranging Response (RNG-RSP) message to the MS 200 in step 211. Further, the target BS 204 allocates wireless resources so that the MS 200 may transmit an ACK message for the RNG-RSP message in step 213. The MS 200 can indicate transmitting of an uplink Bandwidth Request Header (BRH) message in response to the RNG-RSP message in step 215. Upon receipt of the BRH message, the target BS 204 starts downlink data transmission to the MS 200 in step 217.

TABLE 1

| Syntax | Size | Notes |
|---|---|---|
| MOB_HO-IND_Message_Format( ){ | | |
|   Management Message Type = 59 | 8 bits | |
|   reserved =0 | 6 bits | |
|   Mode =0 | 2 bits | |
|   HO_IND_Type=0 | 2 bits | |
|   Ranging_Params_Valid_Indication=0 | 2 bits | |
|   HO_IND_ACK Required | 1 bit | 0=HO_IND_ACK is not required<br>1=HO_IND_ACK is required |

TABLE 1-continued

| Syntax | Size | Notes |
|---|---|---|
| reserved=0 | 3 bits | |
| Target_BS_ID | 48 bits | |
| Preamble Index/Subchannel Index | 8 bits | |
| HMAC/CMAC Tuple | Variable | TLV type |
| } | | |

Table 1 shows a format of the MOB_HO-IND message. The MOB_HO-IND message includes an 8-bit Management Message Type field, a 6-bit reserved field, a 2-bit Mode field, a 2-bit HO_ND Type field, a 2 bit Ranging Params_Valid_Indication field, a 1-bit HO_IND_ACK Required field, a 3-bit reserved field, a 48-bit Target_BS_ID field, and an 8 bit Preamble Index/Subchannel Index field.

The 1-bit HO_IND_ACK Required field set to '0' indicates that HO_IND_ACK is not required, and the 1-bit HO_IND_ACK Required field set to '1' indicates that HO_IND_ACK is required.

TABLE 2

| Syntax | Size | Notes |
|---|---|---|
| MOB_HO-IND-ACK_Message_Format( ){ | | |
| Management Message type=?? | 8 bits | |
| HO_IND_Mode=0 | 2 bits | Same Value of the "Mode" in the MOB_HO-IND message<br>0b00: HO<br>0b01: MDHO/FBSS: Anchor BS update<br>0b10: MDHO/FBSS: Diversity Set update<br>0b11: reserved |
| Confirmation Code | 6 bits | 0: OK<br>1: reject authentication failure<br>2: reject invalid target BSID<br>3: reject other<br>4~63: reserved |
| If(Confirmation code==0){ | | |
| Action Time | 8 bits | This value indicates a suggested value for Action Time from MS.<br>For HO, this value is defined as number of frames until the target BS allocates a dedicated transmission opportunity for RNG-REQ message to be transmitted by the MS using Fast_Ranging_IE. Dedicated allocation for transmission of RNG-REQ means that channel parameters learned by the MS, e.g. during Association of that BS stay valid and can be reused during actual Network Re-entry without preceding CDMA-based Ranging. Final Action Time shall be decided by the serving BS based on the information obtained from potential target BSs over the backbone. A value of zero indicates no opportunity to allocate Fast Ranging IE in any candidate target BS.<br>For MDHO/FBSS, this is the time of update of Anchor BS and/or Diversity Set. A value of zero means no preference from MS. |
| } | | |
| } | | |

Table 2 shows a format of the MOB_HO-IND-ACK message according to an embodiment of the present invention. The MOB_HO-IND-ACK message includes an 8-bit Management Message Type field, a 2-bit HO_IND_Mode field, a 6-bit Confirmation Code field, and an 8-bit Action Time field.

The HO_IND_Mode field has the same value as that of the Mode field in the MOB_HO-IND field. The HO_IND_Mode field set to '0b00' indicates that the corresponding message includes confirmation information for the handover indication of the MS. The HO_IND_Mode field set to '0b01' indicates that the corresponding message includes confirmation information for the indication of updating an Anchor BS for Macro Diversity Handover (MDHO), which is Soft Handover of the MS, or for a Fast Base Station Switching (FBSS) operation. The HO_IND_Mode field set to '0b10' indicates that the corresponding message includes confirmation information for the indication of updating a Diversity Set for MDHO of the MS or an FBSS operation. The HOP_IND_Mode field set to '0b11' indicates that the corresponding value is reserved.

The Confirmation Code field set to '0' indicates successful receipt of the HO_IND message sent by the MS. The Confirmation Code field set to '1' indicates that the indication of the MS is not processed as the serving BS has failed in Message Authentication of the MOB_HO-IND message received from the MS. The Confirmation Code field set to '2' indicates that the indication of the MS is not approved as an identifier (ID) of the target BS requested by the MS is not registered as a neighbor BS of the serving BS. The Confirmation Code field set to '3' indicates that the indication sent by the MS through the MOB_HO-IND message is not approved due to another cause other than the above two causes. The other values 4 to 63 set in the Confirmation Code field are reserved.

The Action Time field includes a time at which the MS and the target BS will newly perform ranging. Therefore, after checking the ranging time included in the HO-IND-ACK message, the MS interrupts the communication with the serving BS and acquires synchronization with the target BS.

TABLE 3

| System | Name | Time Reference | Value | | |
|---|---|---|---|---|---|
| | | | Minimum | Default | Maximum |
| BS | MS Handover Indication Processing Time | Time allowed between the reception of a handover indication and transmission of the its ACK | 1 frame | | 8 frames |
| BS, MS | Handover Indication Retries | Number of Timeout Retries on MOB_HO-IND | 1 | | 3 |

Table 3 shows the parameter format that MS, serving BS and target BS should previously have, according to the present invention.

The serving BS should previously set the time for which it transmits an HO-IND-ACK message in response to an HO-IND message upon receipt of the HO-IND message from the MS. According to the present invention, the serving BS sets the time for which it analyzes and processes the HO-IND message for a period of a minimum of 1 frame to a maximum of 8 frames. When the serving BS fails to transmit the HO-IND-ACK message to the MS within the period of the frame(s), the MS determines that the serving BS has failed to receive the HO-IND message.

When the MS has failed to receive the HO-IND-ACK message from the serving BS, the MS retransmits the MOB_HO-IND message, determining that the serving BS has failed to receive the MOB_HO-IND message. The present invention designates the number of retransmissions as a minimum of 1 to a maximum of 3.

Figure 3:
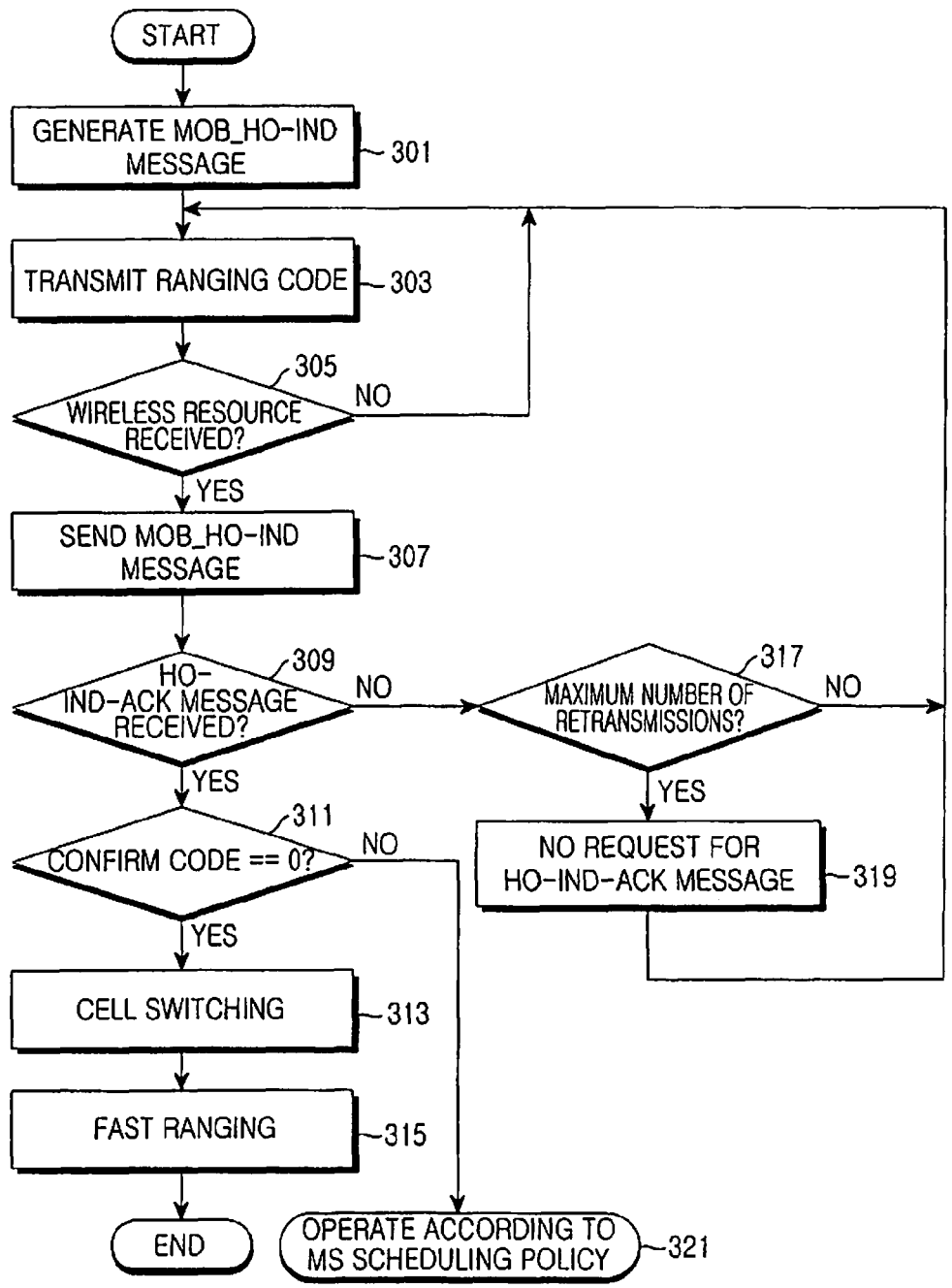
FIG. 3 illustrates an MS's handover procedure according to the present invention.

FIG. 3 illustrates an MS's handover procedure according to the present invention.

Referring to FIG. 3, in step 301, an MS determines a final target BS that can provide the bandwidth and QoS required by the MS, and generates and transmits a MOB_HO-IND message to a serving BS. The MS sets a HO_IND-ACK required field included in the MOB_HO-IND message, to '1'. In step 303, the MS transmits a ranging code for transmitting the MOB_HO-IND message. In step 305, the MS waits for wireless resources from the serving BS to transmit the MOB_HO-IND message. In the event that the MS has wireless resources allocated from the serving BS in step 305, the MS proceeds to step 307. However, in the event that the MS has no wireless resources allocated from the serving BS, the MS returns to step 303 where it transmits a ranging code for transmitting the MOB_HO-IND message.

Upon receiving the wireless resources allocated from the serving BS in step 305, the MS proceeds to step 307 where it transmits the MOB_HO-IND message to the serving BS. The MS determines in step 309 if it has received a HO-IND-ACK message from the serving BS. The MS proceeds to step 311 upon receipt of the HO-IND-ACK message in step 309, and proceeds to step 317 upon failure to receive the HO-IND-ACK message.

In step 311, the MS determines if a Confirmation Code in the HO-IND-ACK message is set to '0'. When the Confirmation Code is set to '0', the MS proceeds to step 313 where it performs Cell Switching. In step 315, the MS performs Fast Ranging for an Action Time in the HO-IND-ACK message.

In the event that the MS fails to receive the HO-IND-ACK message while waiting for a predetermined time (period of 1 frame to 8 frames in the present invention) in step 309, the MS proceeds to step 317 where it determines if the number of retransmissions of the HO-IND message has reached the maximum number of retransmissions. In the event that the number of retransmissions of the HO-IND message has reached the maximum number of retransmissions, the MS proceeds to step 319 where it sets a HO-IND-ACK required field in the MOB_HO-IND message to '0' and then returns to step 303.

In the event that the number of retransmissions of the HO-IND message has not reached yet the maximum number of retransmissions in step 317, the MS returns to step 303 and repeats its succeeding steps.

However, when the Confirmation Code is not set to '0' in step 311, the MS proceeds to step 321 where it operates according to a scheme predefined therein.

As is apparent from the foregoing description, according to the present invention, the MS can determine the success/failure in the transmission of the HO-IND message sent to the serving BS depending on the HO-IND-ACK message during handover, thereby contributing to a decrease in the loss of the downlink data transmitted from the serving BS to the MS.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing a handover procedure by a mobile station (MS) in a wireless communication system, the method comprising:
   determining a target base station (BS) based on a bandwidth and quality of service (QoS);
   transmitting, to a serving BS, a first message comprising information of the target BS and information indicating whether a second message is requested in response to the first message;
   receiving the second message from the serving BS when the information included in the first message indicates that the second message is requested; and
   performing a fast initial access with the target BS,
   wherein the second message includes an action time at which the MS and the target BS perform the fast initial access.

2. The handover method of claim 1, further comprising:
   waiting for the second message for a predetermined time after transmitting the first message to the serving BS.

3. The method of claim 2, further comprising:
   retransmitting the first message upon failure to receive the second message within the predetermined time.

4. A method for performing a handover procedure by a serving base station (BS) in a wireless communication system, the method comprising:
   receiving, from a mobile station (MS), a first message comprising information of a target BS and information indicating whether a second message is requested in response to the first message; and transmitting, to the MS, the second message when the information included in the first message indicates that the second message is requested;

wherein the second message includes an action time at which the MS and the target BS perform a fast initial access.

5. An apparatus for performing a handover procedure in a wireless communication system, the apparatus comprising:

a Mobile Station (MS) for determining a target base station (BS) based on a bandwidth and quality of service (QoS), transmitting to a serving BS a first message comprising information of the target BS and information indicating whether a second message is requested in response to the first message, receiving the second message from the serving BS when the information included in the first message indicates that the second message is requested and performing a fast initial access with the target BS, wherein the second message includes an action time at which the MS and the target BS perform the fast initial access.

6. The handover apparatus of claim 5, wherein the MS waits for the second message for a predetermined time after transmitting the first message to the serving BS.

7. The handover apparatus of claim 6, wherein the MS retransmits the first message upon failure to receive the second message within the predetermined time.

8. An apparatus for performing a handover procedure in a wireless communication system, the apparatus comprising:

a serving base station (BS) for receiving, from a mobile station (MS), a first message comprising information of a target BS and information indicating whether a second message is requested in response to the first message, and transmitting, to the MS, the second message when the information included in the first message indicates that the second message is requested, wherein the second message includes an action time at which the MS and the target BS perform a fast initial access.

* * * * *